Figure 1:
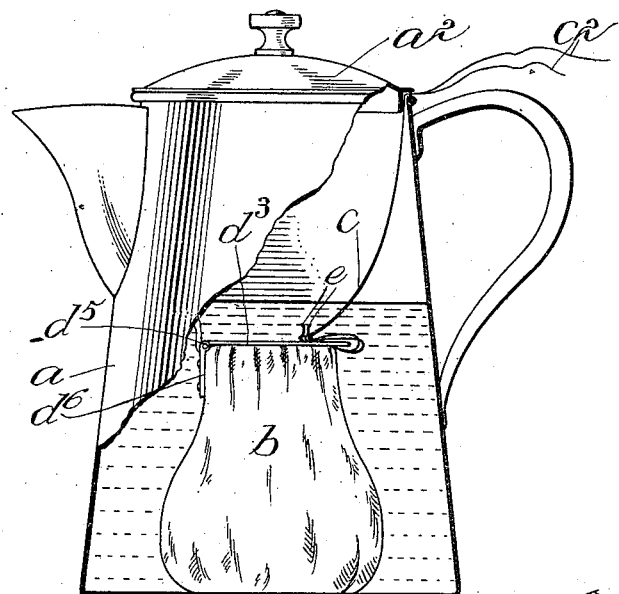

I. NORWOOD.
COFFEE PERCOLATOR BAG.
APPLICATION FILED MAR. 15, 1909.

933,917.

Patented Sept. 14, 1909.

WITNESSES:

INVENTOR
Isabella Norwood
BY
ATTORNEYS

UNITED STATES PATENT OFFICE.

ISABELLA NORWOOD, OF NEW YORK, N. Y.

COFFEE-PERCOLATOR BAG.

933,917.

Specification of Letters Patent. Patented Sept. 14, 1909.

Application filed March 15, 1909. Serial No. 483,396.

*To all whom it may concern:*

Be it known that I, ISABELLA NORWOOD, a citizen of the United States, and residing at New York, in the county of New York and State of New York, have invented certain new and useful Improvements in Coffee-Percolator Bags, of which the following is a specification, such as will enable those skilled in the art to which it appertains to make and use the same.

This invention relates to coffee percolator bags for use in coffee pots; and the object thereof is to provide a bag of this class with improved means for closing the same and which may, if desired, be used in making tea or other brews.

The invention is fully disclosed in the following specification, of which the accompanying drawing forms a part, in which the separate parts of my improvement are designated by suitable reference characters in each of the views, and in which:—

Figure 2:
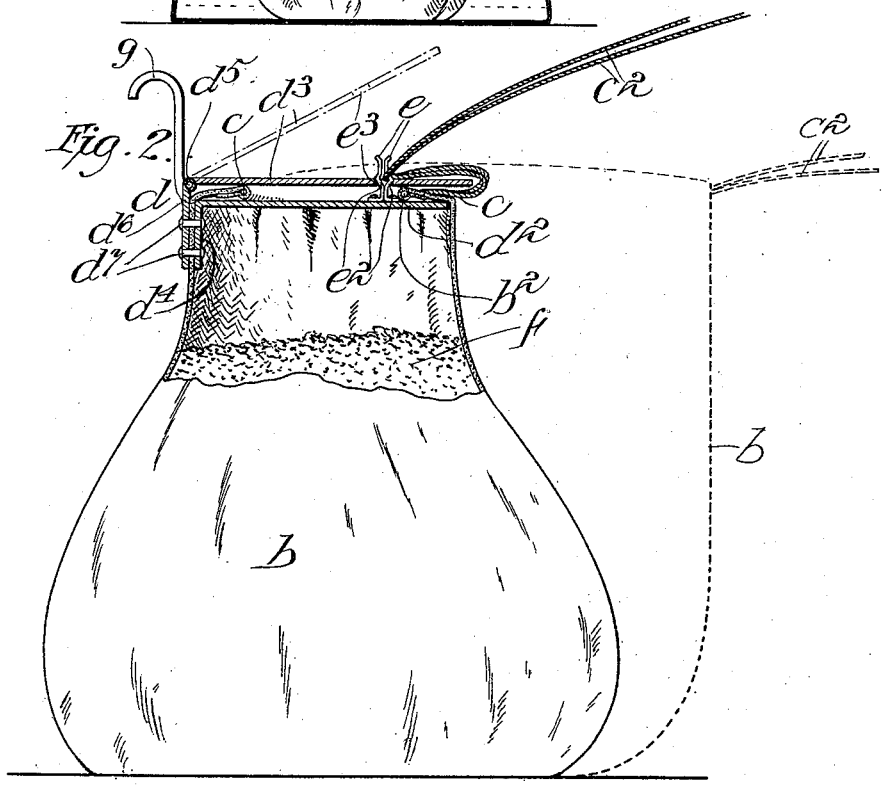

Figure 1 is a side view of a coffee pot with one side broken away and showing my improved coffee percolating bag therein, and;— Fig. 2 a similar view of the bag removed and showing the top of the bag of my improved closure device in section.

In the drawing forming part of this specification, I have shown at $a$ an ordinary coffee pot provided with a removable cover $a^2$ together with my improved coffee percolating bag $b$. The bag $b$ is composed of any suitable fabric, and is open at one end, and in the open end thereof is placed a draw cord or tape $c$ the ends of which are shown at $c^2$.

My improved closure device is shown at $d$, and consists of a bottom plate $d^2$ and top plate $d^3$. The bottom plate $d^2$ is provided, in the form of construction shown, and at one edge thereof with a downwardly directed ear $d^4$, and the top plate $d^3$ is hinged at $d^5$ to a plate $d^6$ which corresponds with the ear $d^4$ of the plate $d^2$.

In connecting the closure device $d$ with the bag $b$, the bottom plate $d^2$ of the closure device is inserted into the open top of the bag as shown in Fig. 2 and the plate $d^6$ which is hinged to the top plate $d^3$ of the closure device is secured to the ear $d^4$ of the bottom plate $d^2$. In the construction shown, this connection is made by means of rivets $d^7$, but in practice this connection may be made in any desired manner, as for instance by stitches or in any other way.

The bottom plate $d^2$ of the closure device near its free edge is provided with upwardly directed spring catches or fingers $e$ which are provided centrally thereof with outwardly directed projections $e^2$, and the top plate $d^3$ is provided with an aperture $e^3$ through which the upper ends of the spring catches or fingers $e$ are adapted to pass, and when said top plate $d^3$ is closed down as shown in full lines in Fig. 2, the spring catches or fingers $e$ pass through the aperture $e^3$, as do also the outwardly directed projections $e^2$, and the said outwardly directed projections $e^2$ lock the top plate $d^3$ in the closed position, but the said top plate $d^3$ of the closure device may be raised by simply applying pressure to the bottom of the free edge thereof.

When the closure device is connected with the bag $b$ as shown and described, and the said bag is filled or partially filled with coffee as shown at $f$, the closure of the bag is effected as follows:—The ends $c^2$ of the draw cord or tape $c$ are pulled so as to contract or draw together the open top of the bag until said open top is drawn together over the bottom plate $d^2$ of the closure device in the form of a circle as shown at $b^2$, the diameter of said circle being less than that of the bottom plate $d^2$ of the closure device. The top plate $d^3$ of the closure device is then closed as shown in full lines in Fig. 2, and the ends of the draw cord or tape $c$ may be passed downwardly between the spring catches or fingers $e$ as is also shown in said figure, and when the bag is put in the pot $a$ as shown in Fig. 1, the ends of the draw cord or tape $c$ extend outwardly over the top edge of the pot as indicated in Fig. 2 and the bag may be lifted from the pot by means of said draw cord or tape whenever desired.

My invention is not limited to the particular form of spring catch device for holding the top part $d^3$ of the closure device in its closed position as herein shown and described, nor to the other details of construction, and various changes therein and modifications thereof may be made, within the scope of the appended claim, without departing from the spirit of my invention or sacrificing its advantages.

I also preferably provide the closure device $d$ with a hook $g$ by means of which the bag $b$ may be suspended in the pot $a$ from the top edge thereof so as to allow the draining or percolating of the coffee through said bag whenever desired and when but little, if any liquid is in the pot, and it will be understood that the said bag may be made of any desired dimensions and of any preferred material as may also the closure device.

Having fully described my invention, what I claim as new and desire to secure by Letters Patent, is:—

A coffee percolating bag open at the top and provided with a draw cord, and a closure device consisting of top and bottom plates, the bottom plate being secured in the top of the bag at one side thereof, and the top plate being loosely connected therewith at said side and the free edge of the top plate being movable toward and from the bottom plate, said top plate being provided with an aperture, and said bottom plate with a fastening device adapted to pass through said aperture, said fastening device being also provided with means whereby the free end of the draw cord may be connected therewith after it is passed through said aperture.

In testimony that I claim the foregoing as my invention I have signed my name in presence of the subscribing witnesses this 12th day of March 1909.

ISABELLA NORWOOD.

Witnesses:
C. E. MULREANY,
H. R. CANFIELD.